Sept. 22, 1953  H. B. WEAVER  2,653,296
METHOD OF TESTING MULTICONDUCTOR INSULATED WIRES
Filed May 25, 1949  2 Sheets-Sheet 1

INVENTOR
H. B. WEAVER
BY *[signature]*
ATTORNEY

Sept. 22, 1953  H. B. WEAVER  2,653,296
METHOD OF TESTING MULTICONDUCTOR INSULATED WIRES
Filed May 25, 1949  2 Sheets-Sheet 2

INVENTOR
H. B. WEAVER
BY
ATTORNEY

Patented Sept. 22, 1953

2,653,296

UNITED STATES PATENT OFFICE 2,653,296

METHOD OF TESTING MULTICONDUCTOR INSULATED WIRES

Harry B. Weaver, Dundalk, Md., assignor to Western Electric Company, Incorporated, New York, N. Y., a corporation of New York Application May 25, 1949, Serial No. 95,318

1 Claim. (Cl. 324—51)

This invention relates to methods of testing multiconductor insulated wires, and more particularly to methods of testing dual-conductor wires for discontinuities and shorts between the conductors.

In the manufacture of insulated conductors of a type including a plurality of conductors insulated one from another, such as, for example, drop wire, the individual conductors of a length are tested both as to continuity and as to shorts between the conductors. Past known methods and apparatus for testing such conductor lengths have been awkward and cumbersome, especially where such a conductor length includes a jacket of tough material enclosing a plurality of conductors insulated one from another.

An object of the invention is to provide new and improved methods of testing multiconductor insulated wires.

Another object of the invention is to provide new and improved methods of testing dual-conductor wires for discontinuities and shorts between the conductors.

A method illustrating certain features of the invention may include electrically connecting an end of one of a pair of conductors of a multiconductor core to an adjacent end of another conductor of the core, applying a difference of potential to other ends of the conductors, measuring flow of current through the conductors to determine continuity thereof, disconnecting said connected ends of the conductors, and measuring flow of current to determine possibility of shorts between the two conductors.

A complete understanding of the invention may be obtained from the following detailed description of a method forming a specific embodiment thereof, when read in conjunction with the appended drawings, in which.

Figure 1:
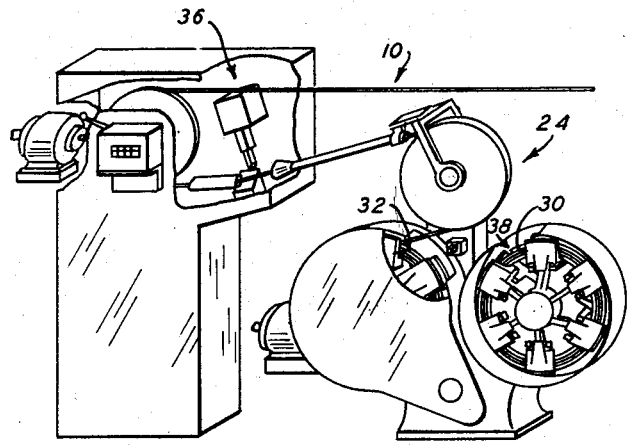
Fig. 1 is a fragmentary, perspective view of an apparatus for practicing a method forming one embodiment of the invention.
Figure 4:
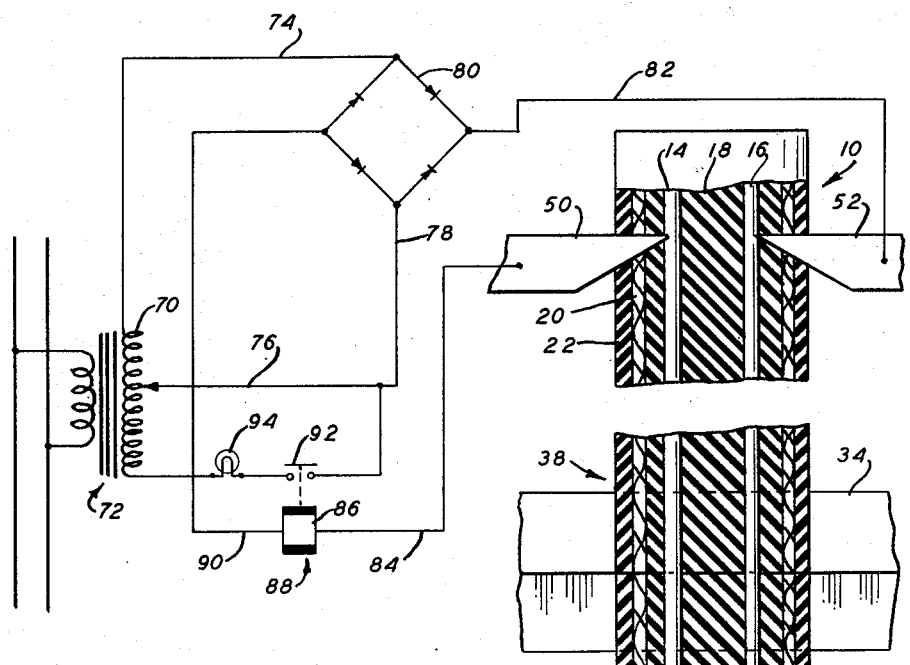
Fig. 4 is a fragmentary, partially diagrammatic view of an electrical circuit forming a portion of the apparatus shown in Fig. 1.

Referring now in detail to the drawings, there is shown in Fig. 1 a coiling and testing apparatus which coils a dual conductor insulated wire 10 coming from a continuous extruding and vulcanizing machine (not shown), tests conductors 14 and 16 (Fig. 4) of the wire for continuity thereof, and tests an insulating covering 18 of generally elliptical form enclosing the conductors for shorts between the conductors. The wire also includes a cotton serving 20 enclosing the insulating covering 18 and a jacket 22 of generally elliptical form enclosing the serving.

The apparatus includes a dual-head coiling device 24 (Fig. 1), portions of which are disclosed and claimed in copending applications Serial No. 738,444, now Patent No. 2,561,736, filed March 31, 1947, by E. D. Hanson for "Apparatus for Coiling Filaments"; Serial No. 24,313, now Patent No. 2,624,771, filed April 30, 1948, by E. D. Hanson for "Collapsible Coiling Heads"; Serial No. 704,819, now Patent No. 2,459,336, filed October 22, 1946, by P. R. Powell for "Collapsible Reels"; and Serial No. 57,014, now Patent No. 2,604,942, filed October 28, 1948, by D. C. Robson for "Apparatus for Advancing and Severing Strands."

The coiling device 24 includes collapsible coiling heads 30 and 32 alternatively operable to wind the wire 10 into coils and to connect electrically the starting ends of the conductors 14 and 16 by contact knives, of which a knife 34 (Fig. 4) is shown. A cutting device 36 (Fig. 1) operates to cut coils, such as a coil 38, from the succeeding portions of the wire after each coil is formed, thereby providing a free end of the wire for starting a coil on the empty one of the coiling heads.

Figure 2:
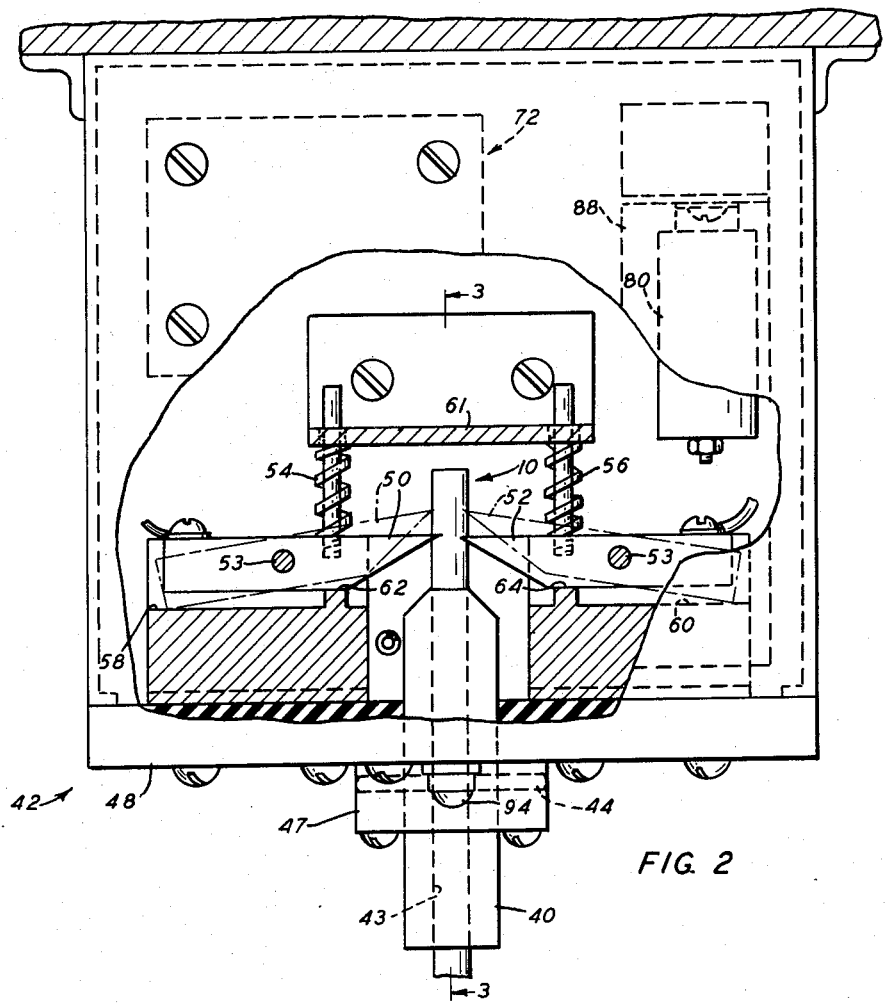
Fig. 2 is an enlarged, fragmentary, top plan view of a portion of the apparatus shown in Fig. 1 with portions thereof broken away.

After the coil 38 has been formed on the coiling head 30 and has been servered by the cutting device 36 from the succeeding portion of the dual conductor insulated wire 10, the starting end of the succeeding portion of the wire is connected to the coiling head 32, which is started to wind a second coil. The newly formed end of the coil 38, which is the outside end of the coil, is pushed through a guide tube 40 (Figs. 2 and 3) of an electrode 42. The guide tube 40 has a passage 43 substantially complementary in cross-sectional shape to the cross-sectional shape of the elliptical wire 10. The guide tube 40 is pivotable about a pin 44 extending across a slot 46 formed in a bracket 47 secured to a frame 48 composed of electrical insulating material.

The end of the wire 10 is forced against contact knives 50 and 52 pivotally mounted on pins 53—53. The wire pivots the knives against compression springs 54 and 56 to fully open positions, in which the knives are against stops 58 and 60 and in which the edges of the knives are spaced apart a distance slightly less than the width of the wire 10. This end of the wire is pushed a short distance beyond the edges of the knives, the knives digging into the jacket, to a stop 61. The wire then is pulled in the reverse direction, and as the wire is so pulled, the knives 50 and 52 are pulled by their contact with the jacket and the actions of the springs 54 and 56 away from the stops 58 and 60 and against stops 62 and 64, respectively, to slightly overcenter positions in which positions the wire locks them. This forces the knives 50 and 52 through the jacket 22, the serving 20 and the insulating covering 18 into good individual electrical contact with the conductors 14 and 16, respectively.

The end of the dual-conductor insulated wire 10 is locked in this position by the knives 50 and 52, and, if the conductors 14 and 16 are continuous from end to end, or if there is a low resistance fault (a short) in the insulating covering 18 (Fig. 4) between the two conductors, electrical current flows through a secondary winding 70 of a transformer 72, conductors 74, 76 and 78, a rectifying device 80, a conductor 82, the contacting knife 52, the conductor 16, the contact knives 34—34 (and a short in the insulating covering if such a short is present), the conductor 14, the contact knife 50, a conductor 84, a winding 86 of a relay 88 and a conductor 90. This energizes the relay winding 86 to close relay contacts 92, which closes a circuit to a lamp 94 to light it.

Lighting of the lamp 94 indicates to an operator that either the conductors 14 and 16 are continuous, or that there is a short in the insulating covering. To determine which of these conditions exists, the operator collapses the coiling head 30, which breaks the connection between the ends of the conductors 14 and 16 previously connected by the contact knives 34—34. If a short between the conductors 14 and 16 in the insulating covering exists, the circuit to the relay winding 86 is kept closed and the lamp 94 remains lighted, thereby indicating that the coil 38 is defective. If such a short does not exist, the circuit to the relay winding 86 is broken and the lamp is darkened, thereby indicating that the coil 38 has no short and that each of the conductors 14 and 16 is continuous.

Thus, if the coil 38 has neither a short in the insulating covering 18 nor a discontinuity (an "open") in one of the conductors 14 and 16, the lamp is lighted only when the knives 34—34 are bridging the conductors 14 and 16 and is dark when this connection is broken. If there is a short, the lamp is lighted during both steps. If there is an open but no short, the lamp is not lighted during either step. If there is both an open and a short, the lamp is either lighted during both steps or is dark during both steps, depending upon the relative positions of the open and the short along the length of the dual-conductor insulated wire 10. Hence, the above-described method and apparatus give a definite test as to the acceptability of the coils of the wire 10, and indicate definitely each rejectable coil.

Figure 3:
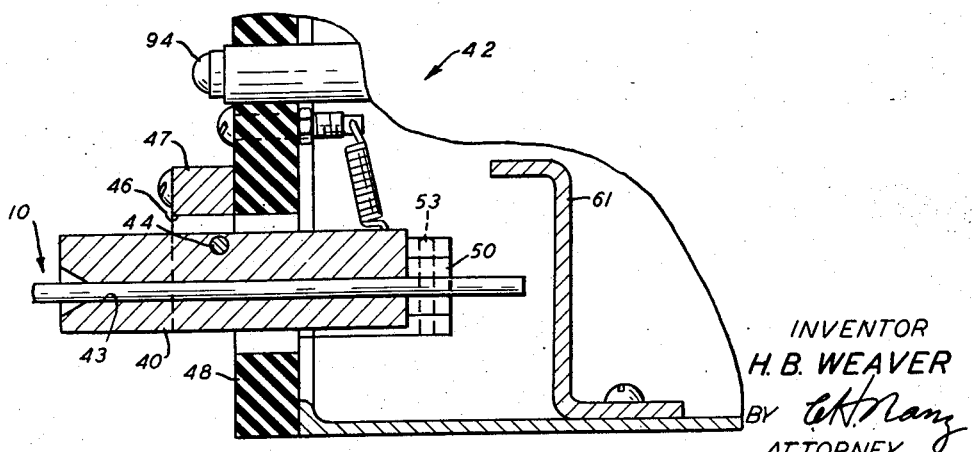
Fig. 3 is a vertical section taken along line 3—3 of Fig. 2.

After the tests as to shorts and opens have been completed, the wire 10 is pushed farther into the tube to release it from the bite of the knives, and the portion thereof to the left of the guide tube 40, as viewed in Fig. 3, is moved upwardly. This pivots the guide tube and slides the portion of the wire 10 engaged by the knives 50 and 52 downwardly with respect to and out of engagement with these knives. The wire 10 then is pulled out of the guide tube, the coil 38 is tied, is marked in accordance with the results of the test, and is removed from the coiling head 30.

What is claimed is:

The method of testing individually insulated conductors of multiconductor wires, which comprises connecting an end of one insulated conductor of a length of such wire to an adjacent end of another conductor of the wire, applying a difference of potential across the other ends of the same conductors, ascertaining whether any current flows in the circuit formed by the connected conductors to determine whether said conductors are electrically continuous from end to end, disconnecting the first-mentioned ends of said conductors while the difference of potential is still applied to the other ends of conductors, and ascertaining whether any current flows in the open circuited conductors to determine whether there are any low resistance faults in the insulating coverings on the said conductors.

HARRY B. WEAVER.

References Cited in the file of this patent
UNITED STATES PATENTS

| Number | Name | Date |
|---|---|---|
| 1,605,033 | Jensen | Nov. 2, 1926 |
| 1,886,489 | Ludwig | Nov. 8, 1932 |
| 1,977,677 | Hill | Oct. 23, 1934 |
| 2,167,209 | Huskey | July 25, 1939 |
| 2,408,045 | Cottrell | Sept. 24, 1946 |
| 2,439,940 | Lewis | Apr. 20, 1948 |
| 2,456,453 | Shailor | Dec. 14, 1948 |
| 2,469,703 | Simkins | May 10, 1949 |
| 2,550,233 | Duncan | Apr. 24, 1951 |